July 26, 1966 M. A. COPE 3,262,333
HANDBRAKE APPLYING MEANS
Filed Oct. 17, 1963
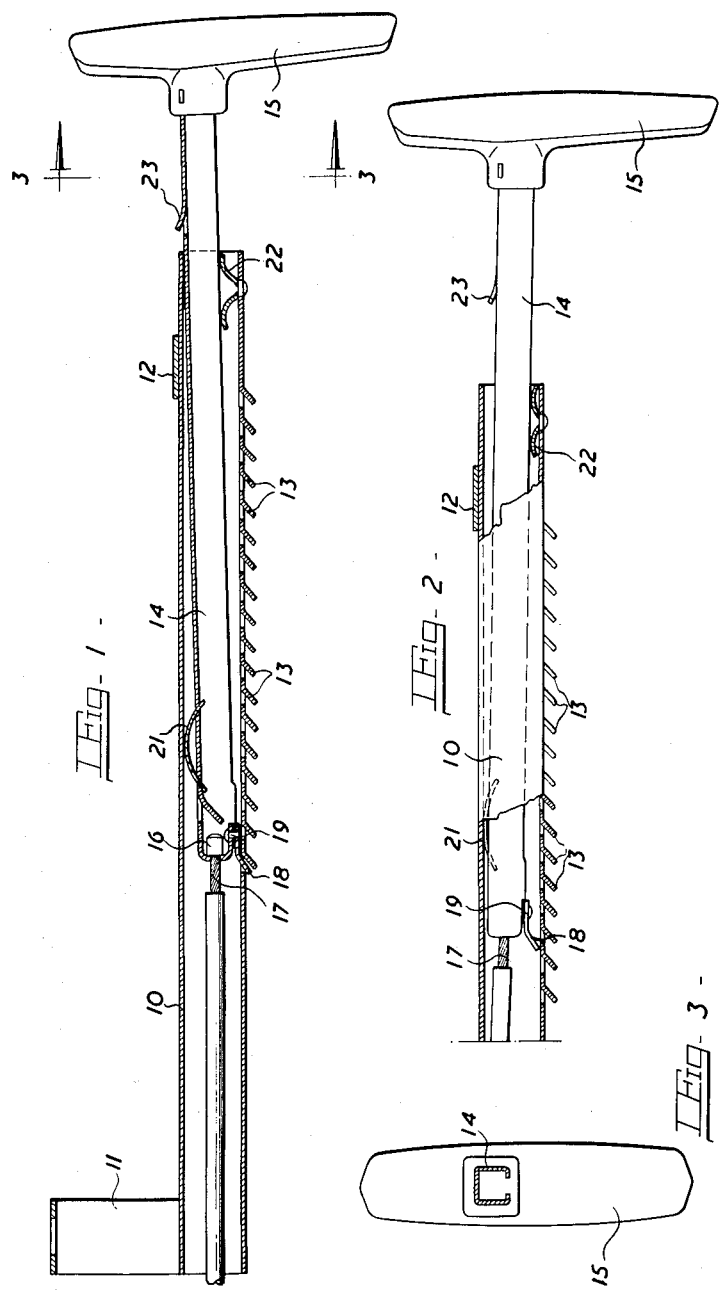
Matthew Alan Cope
BY Scrivener + Parker 3,262,333
HANDBRAKE APPLYING MEANS
Matthew Alan Cope, Solihull, England, assignor to Girling Limited, Tyseley, England, a British company
Filed Oct. 17, 1963, Ser. No. 316,847
Claims priority, application Great Britain, Oct. 26, 1962, 40,543/62
3 Claims. (Cl. 74—502)

This invention relates to improvements in applying means for a hand brake on a vehicle and relates particularly to means of the kind comprising a rod or bar which is axially movable in a housing mounted on or in the dashboard or other convenient part of the vehicle, the outer end of the rod being provided with a handle and its inner end being connected to the brake by a Bowden cable or other flexible member. Ratchet mechanism is provided between the rod and the housing to hold the brake in the applied position, and the ratchet mechanism is usually released by partially rotating the rod or by means of a trigger associated with the handle.

According to my invention, in hand brake applying means of the kind set forth, a ratchet engagement between the axially movable rod and the housing is disengaged by a rocking movement of the rod, preferably against spring loading. The brake is applied by pulling the handle outwardly in the usual way and is released by rocking the rod by means of the handle in a plane which contains the axis of the housing and which is preferably vertical.

One form of hand brake in accordance with my invention is illustrated by way of example in the accompanying drawings in which:

FIGURE 1 is a longitudinal section of the assembly showing the hand brake rod locked in the brake applied position.

FIGURE 2 is a similar section showing the rod in the released position.

FIGURE 3 is a fragmentary section on the line 3—3 of FIGURE 1.

In the assembly illustrated the housing 10 is a tube of square or other rectangular cross-section adapted to be mounted by means of brackets 11, 12 on a convenient part of a vehicle such as the dashboard. A series of tongues 13 are pierced out of the bottom wall of the housing and bent down to form longitudinally spaced ratchet teeth.

The rod 14 is a member of inverted channel section, the depth of the section being substantially less than the internal depth of the housing. At its outer end the rod carries a handle 15 and at its inner end the web of the section is cranked downwardly and back to form a pocket to reecive a nipple 16 on the end of a cable 17 leading to the brake.

A downwardly inclined pawl tooth 18 for engagement with the ratchet teeth 13 on the housing is secured to the underside of the pocket by a rivet 19 and is urged into engagement with the ratchet teeth by a light curved blade spring 21 mounted in the web of the rod and bearing on the upper wall of the housing.

A fulcrum 22 for the rod is located on the bottom wall of the housing at or adjacent to its outer end. This fulcrum may be rigid but preferably it is formed by a resilient member which in this case is a heavy blade spring of wide V outline, and the height of the fulcrum is such that normally the upper surface of the rod 14 is held in sliding contact with or closely adjacent to the upper wall of the housing at its outer end as shown in FIGURE 1.

To apply the brake the rod is pulled outwardly in the usual way by means of the handle 15. The pawl tooth 18 rides over the ratchet teeth 13 in the housing, and when the brake is fully applied and the handle is released the pawl tooth engages in one of the ratchet teeth 13 as shown in FIGURE 1 and holds the rod in the brake-applied position.

To release the brake a pull is applied to the handle to take the load off the pawl tooth and the handle is pressed downwardly. This rocks the rod 14 about the fulcrum 22 and raises its inner end against the resistance of the spring 21 to lift the pawl tooth 18 clear of the bottom of the housing as shown in FIGURE 2 so that the rod is free to move inwardly to release the brake.

A stop to limit the inward movement of the rod may be formed by a tongue 23 which is pierced and pressed up out of the web of the rod and is adapted to abut on the outer end of the housing.

I claim:
1. Means for applying a vehicle handbrake comprising a housing adapted to be mounted on structure of the vehicle and having an inner end and an outer end, a rod of a depth less than the depth of said housing axially movable in the housing and having an inner end and an outer end of which the rod at its outer end projects from the outer end of said housing, a handle on the outer end of said rod, a flexible cable connected to the inner end of said rod and adapted to be connected to the brake, ratchet teeth on the housing, a pawl tooth on said rod adapted to engage said teeth to hold the brake in the applied position, and a fulcrum in the housing about which the rod is adapted to be rocked to disengage the pawl tooth from said ratchet teeth.

2. Means as claimed in claim 1, and further including spring means located between the housing and the rod to urge the rod at its inner end in a direction to hold the pawl tooth on the rod in engagement with the ratchet teeth on the housing.

3. Means as claimed in claim 1, wherein said housing is a tube of rectangular cross-section and the fulcrum comprises a resilient member secured to the bottom wall of the housing at the outer end of the housing.

References Cited by the Examiner
UNITED STATES PATENTS
2,177,456  10/1939  Irving _____ 74—502
2,591,495   4/1952  Baldwin et al. _____ 74—503

MILTON KAUFMAN, Primary Examiner.